(12) United States Patent
Park et al.

(10) Patent No.: US 12,532,190 B2
(45) Date of Patent: Jan. 20, 2026

(54) METHOD AND APPARATUS FOR CERTIFICATION OF UE ORIENTED BEAM MANAGEMENT

(71) Applicant: SAMSUNG ELECTRONICS CO., LTD., Suwon-si (KR)

(72) Inventors: Kyoungmin Park, Suwon-si (KR); Hyunseok Ryu, Suwon-si (KR); Junyung Yi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 481 days.

(21) Appl. No.: 18/064,776

(22) Filed: Dec. 12, 2022

(65) Prior Publication Data

US 2023/0189019 A1 Jun. 15, 2023

(30) Foreign Application Priority Data

Dec. 13, 2021 (KR) .......................... 10-2021-0177585

(51) Int. Cl.
*H04W 16/28* (2009.01)
*H04W 8/22* (2009.01)

(52) U.S. Cl.
CPC ............. *H04W 16/28* (2013.01); *H04W 8/22* (2013.01)

(58) Field of Classification Search
CPC ................................ H04W 16/28; H04W 8/22
See application file for complete search history.

(56) References Cited

U.S. PATENT DOCUMENTS

| 2011/0211490 | A1* | 9/2011 | Nikula | H04B 7/086 |
| | | | | 370/252 |
| 2016/0013858 | A1* | 1/2016 | Jalali | H04B 7/06952 |
| | | | | 370/318 |
| 2017/0318541 | A1* | 11/2017 | Islam | H04B 7/0617 |
| 2018/0206132 | A1* | 7/2018 | Guo | H04W 16/28 |
| 2018/0227035 | A1* | 8/2018 | Cheng | H04B 7/0626 |
| 2018/0324715 | A1* | 11/2018 | Ryoo | H04W 72/20 |
| 2018/0324863 | A1* | 11/2018 | Akoum | H04B 7/0695 |
| 2018/0368125 | A1* | 12/2018 | Cezanne | H04W 72/046 |
| 2019/0068263 | A1* | 2/2019 | Yu | H04B 7/046 |
| 2019/0199412 | A1* | 6/2019 | Koskela | H04B 7/0639 |

(Continued)

FOREIGN PATENT DOCUMENTS

WO 2021056506 A1 4/2021

OTHER PUBLICATIONS

International Search Report and Written Opinion of the International Searching Authority dated Mar. 15, 2023, in connection with International Application No. PCT/KR2022/020111, 8 pages.

*Primary Examiner* — Fahmida S Chowdhury

(57) ABSTRACT

The disclosure relates to a 5G or 6G communication system for supporting a higher data transmission rate. An embodiment of the disclosure relates to a method and apparatus for transmitting multicast data to a terminal in a 5G network. The method comprises: identifying to perform a terminal based beam management based on at least one of a communication environment or a capability of the terminal; transmitting, to a base station, a first message for requesting an allowance of the terminal based beam management; and receiving, from the base station, a second message including information indicating whether the terminal based beam management is allowed.

16 Claims, 9 Drawing Sheets

(56) References Cited

U.S. PATENT DOCUMENTS

| | | | |
|---|---|---|---|
| 2019/0199496 A1* | 6/2019 | Qin | H04W 72/23 |
| 2019/0363843 A1* | 11/2019 | Gordaychik | H04W 28/16 |
| 2020/0136708 A1 | 4/2020 | Pan et al. | |
| 2020/0145977 A1* | 5/2020 | Kumar | G01S 5/0063 |
| 2020/0196383 A1* | 6/2020 | Tsai | H04W 76/11 |
| 2020/0228180 A1* | 7/2020 | Zhang | H04B 7/06958 |
| 2021/0152447 A1* | 5/2021 | Yang | H04B 7/0617 |
| 2021/0175957 A1* | 6/2021 | Raghavan | H04B 7/0695 |
| 2021/0227409 A1* | 7/2021 | Siomina | H04W 72/542 |
| 2021/0345299 A1* | 11/2021 | Gao | H04B 7/06968 |
| 2021/0376894 A1* | 12/2021 | Cha | H04B 7/088 |
| 2022/0361007 A1* | 11/2022 | Cui | H04W 74/0833 |
| 2023/0052430 A1* | 2/2023 | Kang | H04B 7/088 |
| 2023/0164607 A1* | 5/2023 | Koskela | H04W 24/10 370/328 |
| 2023/0189019 A1* | 6/2023 | Park | H04B 7/06952 370/329 |

* cited by examiner

METHOD AND APPARATUS FOR CERTIFICATION OF UE ORIENTED BEAM MANAGEMENT

CROSS-REFERENCE TO RELATED APPLICATION(S)

This application is based on and claims priority under 35 U.S.C. § 119 of a Korean Patent Application Number 10-2021-0177585, filed Dec. 13, 2021, in the Korean Intellectual Property Office, the disclosure of each of which is incorporated by reference herein in its entirety.

BACKGROUND

1. Field

The disclosure relates to a method and apparatus for beam management in a wireless communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NRU) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using orbital angular momentum, and reconfigurable intelligent surface (RIS), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

An object of the disclosure is to provide a user equipment (UE) oriented beam management scheme in which a terminal other than a base station directly determines a beam to be used for communication, and a pre-certification process of a base station required for the operation of the scheme.

In addition, an object of the disclosure is to provide more flexible beam management compared to conventional schemes and to prevent performance degradation such as beam collision caused by inappropriate beam selection of a terminal.

The objects to be achieved by the disclosure are not limited to the aforesaid, and other objects not described herein with be clearly understood by those skilled in the art from the descriptions below.

In accordance with an aspect of the disclosure, a method performed by a terminal in a communication system is provided. The method comprises; identifying to perform a terminal based beam management based on at least one of a communication environment or a capability of the terminal; transmitting, to a base station, a first message for requesting an allowance of the terminal based beam management; and receiving, from the base station, a second message including information indicating whether the terminal based beam management is allowed.

In an embodiment, the method further comprises: determining a beam based on a measurement result; transmitting, to the base station, a third message for requesting a beam changing to the determined beam; and receiving, from the base station, a fourth message including information on a result of the beam changing.

In an embodiment, the identifying to perform the terminal based beam management comprises: receiving, from the base station, at least one of information indicating whether the terminal is allowed to perform the terminal based beam management or information on a required capability of the terminal to perform the terminal based beam management; and identifying to perform the terminal based beam management based on the at least one of the information indicating whether the terminal is allowed to perform the terminal based beam management, the information on a required capability of the terminal to perform the terminal based beam management, the communication environment, or the capability of the terminal.

In an embodiment, the method further comprises: adjusting the capability of the terminal based on the required capability of the terminal to perform the terminal based beam management.

In an embodiment, the information on a result of the beam changing comprises at least one of first information on a scheduling based on the determined beam, second information indicating whether the beam changing is allowed, or third information on a beam selected by the base station based on the third message.

In accordance with an aspect of the disclosure, a method performed by a network entity in a communication system is provided. The method comprises: receiving, from a terminal, a first message for requesting an allowance of a terminal based beam management; determining whether to allow the terminal based beam management at least one of a communication environment or a capability of the terminal; and transmitting, to the terminal, a second message including information indicating whether the terminal based beam management is allowed.

In an embodiment, the method further comprises: receiving, from the base terminal, a third message for requesting a beam changing to a beam determined by the terminal; and transmitting, to the terminal, a fourth message including information on a result of the beam changing.

In an embodiment, the method further comprises: identifying the communication environment; determining whether the terminal is allowed to perform the terminal based beam management based on the communication environment; and transmitting, to the terminal, at least one of information indicating whether the terminal is allowed to perform the terminal based beam management or information on a required capability of the terminal to perform the terminal based beam management.

In an embodiment, the first message comprises information indicating that the terminal adjusts the capability of the terminal based on the required capability of the terminal to perform the terminal based beam management.

In an embodiment, the information on a result of the beam changing comprises at least one of first information on a scheduling based on the determined beam, second information indicating whether the beam changing is allowed, or third information on a beam selected by the base station based on the third message.

In accordance with an aspect of the disclosure, a terminal in a communication system is provided. The terminal comprises: a transceiver; and a controller coupled with the transceiver and configured to: identify to perform a terminal based beam management based on at least one of a communication environment or a capability of the terminal, transmit, to a base station, a first message for requesting an allowance of the terminal based beam management, and receive, from the base station, a second message including information indicating whether the terminal based beam management is allowed.

In accordance with an aspect of the disclosure, a network entity in a communication system is provided. The network entity comprises: a transceiver; and a controller coupled with the transceiver and configured to: receive, from a terminal, a first message for requesting an allowance of a terminal based beam management, determine whether to allow the terminal based beam management at least one of a communication environment or a capability of the terminal, and transmit, to the terminal, a second message including information indicating whether the terminal based beam management is allowed.

According to an embodiment of the disclosure, it is possible to provide a user equipment (UE) oriented beam management scheme in which a terminal other than a base station directly determines a beam to be used for communication, and a pre-certification process of a base station required for the operation of the scheme.

In addition, according to an embodiment of the disclosure, it is possible to provide more flexible beam management compared to conventional schemes and to prevent performance degradation such as beam collision caused by inappropriate beam selection of a terminal.

Effects obtainable from the disclosure may not be limited to the above-mentioned effects, and other effects which are not mentioned may be clearly understood, through the following descriptions, by those skilled in the art to which the disclosure pertains.

DETAILED DESCRIPTION

Figure 1:
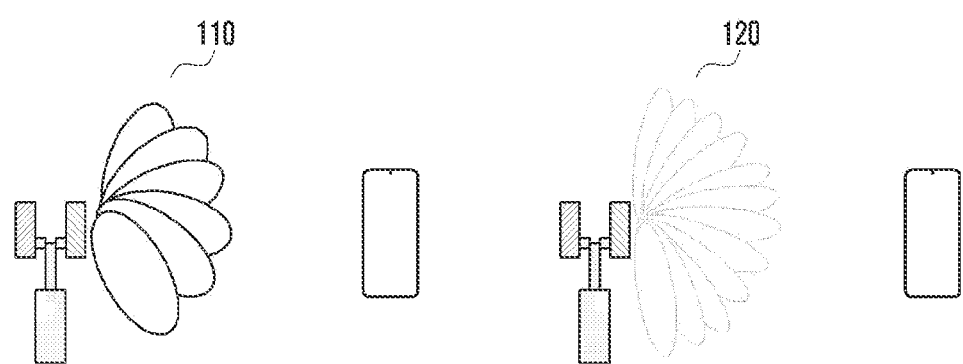
FIG. 1 illustrates a view illustrating an example of a change in the number of beams to be measured and reported by a terminal according to beam directionality.

Hereinafter, the operational principle of the disclosure is described below with reference to the accompanying drawings. In the following description of the disclosure, if it is determined that a detailed description of related known functions or structures may unnecessarily obscure the subject matter of the disclosure, the detailed description will be omitted. The terms as used herein are defined considering the functions in the disclosure and may be replaced with other terms according to the intention or practice of the user or operator. Therefore, the terms should be defined based on the overall disclosure.

In the following description of the disclosure, if it is determined that a detailed description of related known functions or structures may unnecessarily obscure the subject matter of the disclosure, the detailed description will be omitted. Hereinafter, embodiments of the disclosure will be described with reference to the accompanying drawings.

As used herein, terms for identifying access nodes, terms denoting network entities, terms denoting messages, terms denoting inter-network entity interfaces, and terms denoting various pieces of identification information are provided as an example for ease of description. Thus, the disclosure is not limited to the terms, and the terms may be replaced with other terms denoting objects with equivalent technical meanings.

The 5G mobile communication network includes 5G user equipment (UE, terminal), 5G radio access network (RAN), a base station, 5g nodeB (gNB), evolved nodeB (eNB, etc.), and 5G core network. The 5G core network is constituted with network functions such as an access and mobility management function (AMF) that provides a mobility management function of the UE, a session management function (SMF) that provides a session management function, a user plane function (UPF) that performs a data delivery role, a policy control function (PCF) that provides policy control function, unified data management (UDM) that provides data management functions such as subscriber data and policy control data, and unified data repository (UDR) that stores data of various network functions, such as UDM.

The disclosure provides an entire process for performing a UE oriented beam management scheme in performing a beam management scheme, which is a core technology of mmwave communication. In the entire process, when a base station determines an in-scope beam in advance and a terminal reports measurement results for the in-scope beam, the base station can perform beam selection targeting more diverse beams, instead of the conventional method of using one of the in-scope beams for downlink, uplink, or bidirectional transmission based on the report.

In particular, the disclosure provides an operation in which a base station determines UE performance requirement items and permits each UE to use a UE oriented beam management scheme based on this, and also provides a method and process for how the base station reflects the beam when the UE determines the beam and makes a request to the base station.

Figure 2:
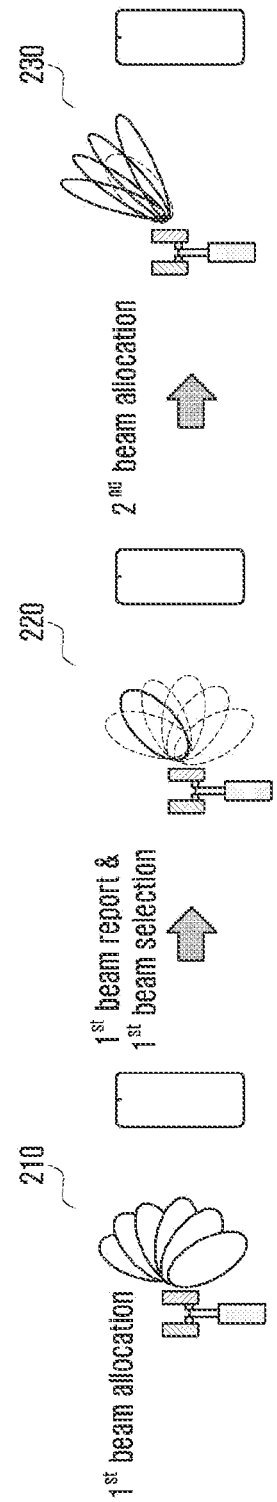
FIG. 2 illustrates an example of a multi-step beam management scheme.
Figure 3:
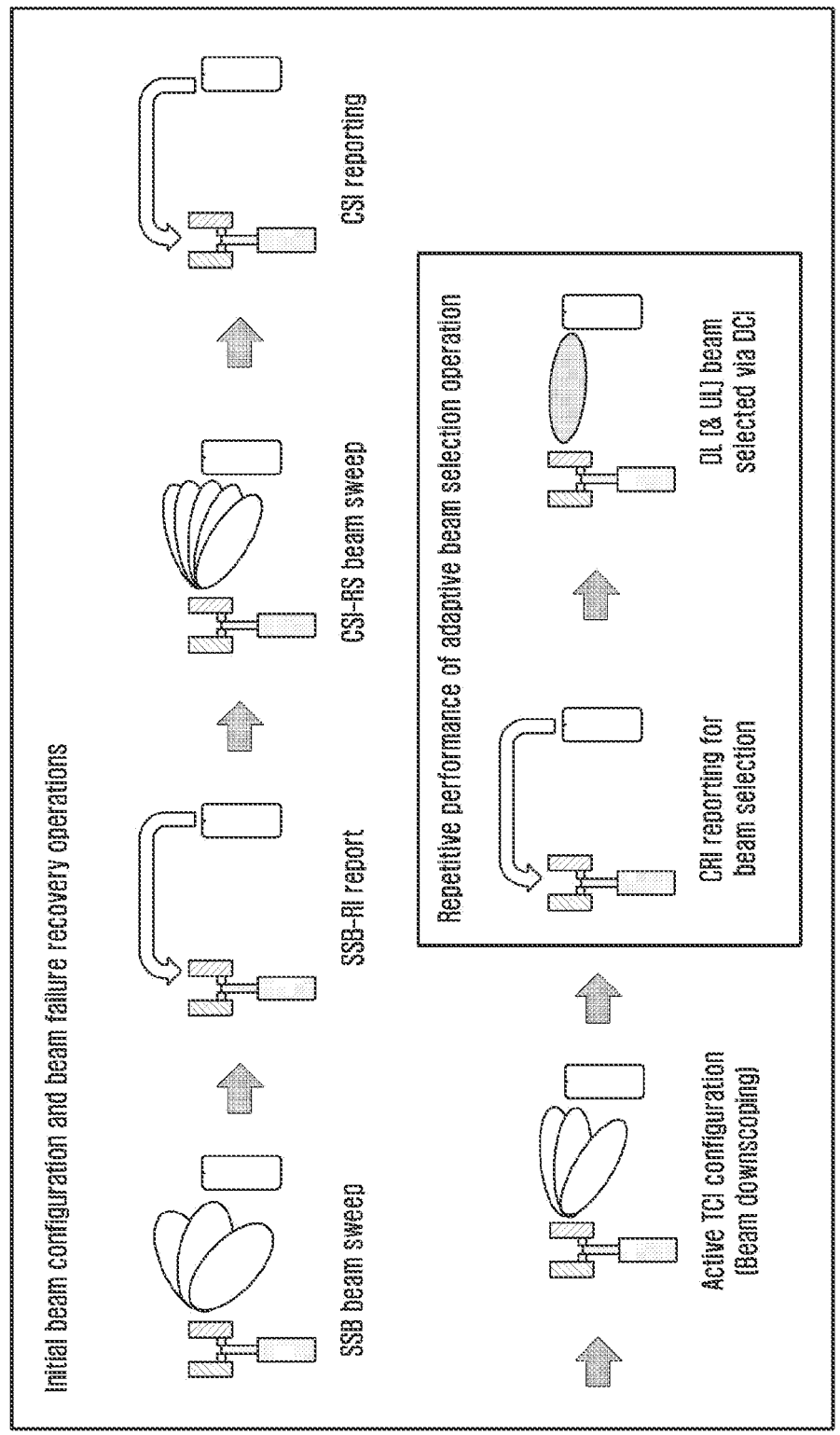
FIG. 3 illustrates an example of a multi-step beam management scheme.
Figure 4:
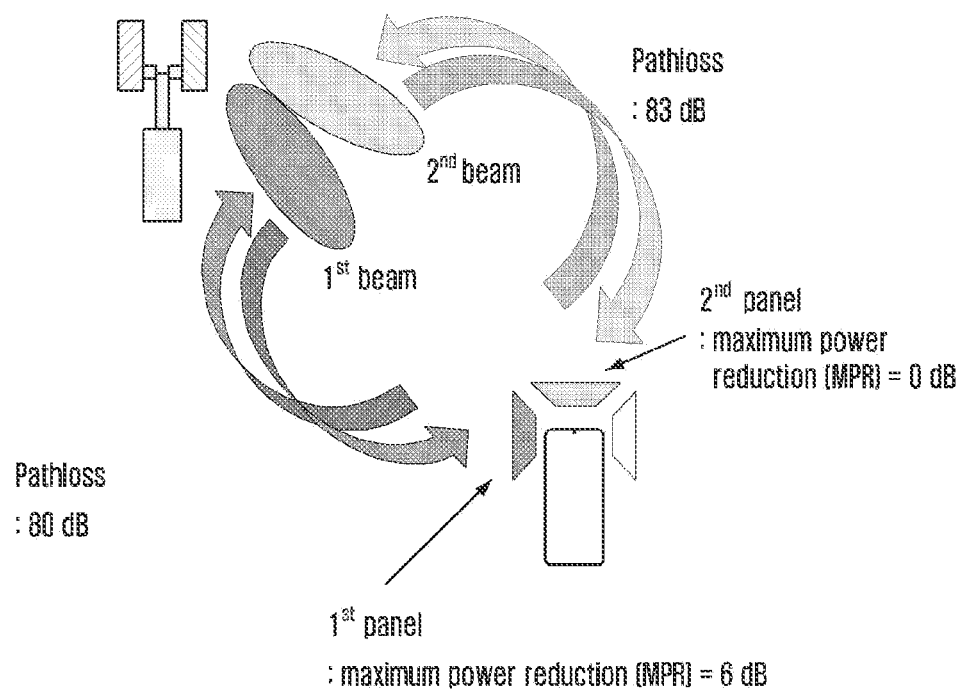
FIG. 4 illustrates an example of a case where a downlink beam and an uplink beam are separately managed.

FIG. 1 illustrates an example of a change in the number of beams to be measured and reported by the UE according to beam directionality, FIG. 2 is a view illustrating an example of a multi-step beam management scheme, FIG. 3 is a view illustrating a multi-step beam management defined by 3GPP, and FIG. 4 is a view illustrating an example of a case where a downlink beam and an uplink beam need to be separately managed.

<Multi-Step Beam Management Scheme>

In order to support wireless communication in mmwave or frequency rage 2 (hereinafter referred to as FR2) areas where propagation loss is severe, it is essential to secure additional processing gain and offset propagation loss through beamforming at both the base station and the UE.

In forming beams at both the base station and the UE, a beam with high directionality can provide a higher gain, while a beam with high directionality is more sensitive to beam management errors and requires more work to be performed in beam determination.

With reference to FIG. 1, in the case 110 where a base station communicates using a beam with low directivity (wide beam) and the case 120 where the base station communicates with a beam with high directionality (narrow beam), in order to support the same communication area, there is a difference in the number of beams to be generated by the base station and a difference in the number of beams to be measured and reported by the UE.

As a method for securing a beam gain through the beam with high directionality and adjusting the number of beams to be operated by the base station and the UE to an appropriate level, a multi-step beam management scheme has been defined in the standard, and the basic operation is the same as the example of FIG. 2. As illustrated in FIG. 2, the base station starts the beam management operation by configuring and transmitting a small number of wide beams, and the UE measures the reception performance of the wide beams and may report one or some beams that support the best performance among them 210. The base station configures and transmits several narrow beams having similar directionality based on the reported wide beam, and the UE can measure the reception performance for the several narrow beams and report the measurement to the base station (220, 230). The base station can select an optimal beam from among the narrow beams and use the selected beam for communication. When compared with the narrow beam management scheme illustrated in FIG. 1, it can be seen that the number of narrow beams transmitted by the base station and reported by the UE is greatly reduced from 16 to 4.

FIG. 3 illustrates a multi-stage beam management scheme defined by 3GPP. As illustrated in FIG. 3, the 3GPP standard goes through a final selection process of in-scope (candidate) beams, which is active transmission configuration indication (TCI) state configuration, and may select eight or less in-scope beams among up to 64 determinable channel state information reference signal (CSI-RS) beams. The number of finally selected in-scope beams may be determined by a physical downlink control channel (PDCCH) format that the base station mainly intends to use, the number of active TCI states that the UE can support, and the like. As can be seen in FIG. 3, if it is not the case of an initial beam configuration operation or the case of requiring beam recovery due to a beam failure occurrence, the base station and the UE perform measurement, reporting, and beam selection processes for the in-scope beams.

<Beam Reciprocity-Based Uplink Beam Management Scheme>

The operations illustrated in FIG. 3 represent a process of performing downlink beam selection between the base station and the UE based on transmission beam selection of the base station. Among the illustrated operations, when the UE performs an operation of reporting a measurement result through uplink, the corresponding operation is performed using the same uplink beam as the downlink selected in each operation. Accordingly, if the downlink beam configuration illustrated in FIG. 3 is successfully operated, this may mean that the same beam is successfully used to deliver control information through the uplink. That is, it means that beam reciprocity exists between the downlink and the uplink, and it is possible to use a beam selected for the downlink based on the beam reciprocity in the uplink.

As an exceptional case, when the UE uses different antennas for downlink and uplink, or the UE transmits a signal in a specific direction, in the case that maximum power reduction (MPR), which requires the UE to significantly lower the signal output, occurs, the downlink and uplink beams may be different. In this case, the base station and the UE may be burdened with additional performance of the multi-step beam management process illustrated in FIG. 3 for uplink beam control.

FIG. 4 illustrates an example of a case where configurations of the uplink beam and the downlink beam are to be changed. A case where a first panel can support communication using a first beam and a second panel can support communication using a second beam is considered. In the case that the first beam having the pathloss of 80 dB has the power reduction lower than that of the second beam having the pathloss of 83 dB, it may be an appropriate choice for the base station and the UE to use the first beam during downlink communication. On the other hand, in the case of uplink communication, the maximum transmission power of the first panel is 6 dB lower than the maximum transmission power of the second panel, so when the UE uses the first beam, the received power of the base station is lowered by 3 dB compared to the case of using the second beam. Therefore, in this case, using the second beam may be a better choice for uplink communication.

The multi-step beam management scheme is an excellent scheme capable of realizing both beam gain and low complexity of beam management, but has a disadvantage in that beams other than preselected in-order beams cannot be used for communication. Accordingly, in the case that the base station incorrectly determines in-scope beams or channel conditions rapidly change so that previously configured in-scope beams are no longer appropriate beams, in-scope beams may be configured again through a beam reconfiguration operation. Since the reconfiguration operation requires a radio resource control (RRC) reconfiguration process, signaling overhead may significantly increase when the in-scope beam reconfiguration occurs frequently, and since communication is impossible during the in-scope beam reconfiguration period, a decrease in the quality of service may occur.

In addition, in the case that the uplink beam management and the downlink beam management are to be performed separately, the multi-step operation may be performed separately for the downlink beam management and the uplink beam management, which resulting in the disadvantage of greatly increasing complexity and signaling overhead.

Accordingly, the disclosure provides a UE oriented beam management scheme in which the UE, not the base station, directly determines a beam to be used for communication, and a pre-certification process of the base station required for the operation of the scheme.

The multi-step beam management scheme provided by 3GPP is a beam selection scheme under the management of the base station and may provide the best performance. However, as described above, this scheme cannot reflect all channel situations, and also cannot be adaptable to rapid channel changes. As a way to solve this problem, standardization of a UE-oriented beam management scheme in which the UE directly determines a beam to be used for communication has been provided. However, due to concerns about the fact that the success of the UE-oriented beam management scheme is greatly influenced by the UE performance, standardization thereof has failed.

Therefore, as a solution to this, an embodiment of the disclosure has the following embodiments.

In one embodiment, a UE-oriented beam management can be defined as an operation in which a UE measures reception performance for beams other than preconfigured in-scope beams, determines (identifies) an appropriate beam among the beams, and then requests the base station to use the determined (identified) beam.

In one example, an operation in which the UE determines a beam other than an in-scope beam as a beam to be used for downlink beam or for both downlink and uplink, and requests the base station to use it. Hereinafter, this operation is referred to as an out-of-scope (non-candidate) determination scheme.

In another example, a method in which the UE determines an uplink beam differently from a downlink beam and reports it to the base station. The uplink beam may be one of in-scope beams configured to be used for downlink, uplink, or both uplink and downlink communication, or may be an out-of-scope beam.

In one embodiment, an operation in which the network defines and notifies a UE performance index required to perform UE-oriented beam management is defined, and a UE-oriented beam management scheme based on network permission in which the network directly determines a UE to perform the UE-oriented beam management scheme according to the above operation and the UE performance report to be performed subsequently is provided.

Through the above-described embodiments in the disclosure, more flexible beam management is possible compared to the conventional schemes, and performance degradation such as beam collision due to inappropriate beam selection of the UE can be prevented.

Figure 5:
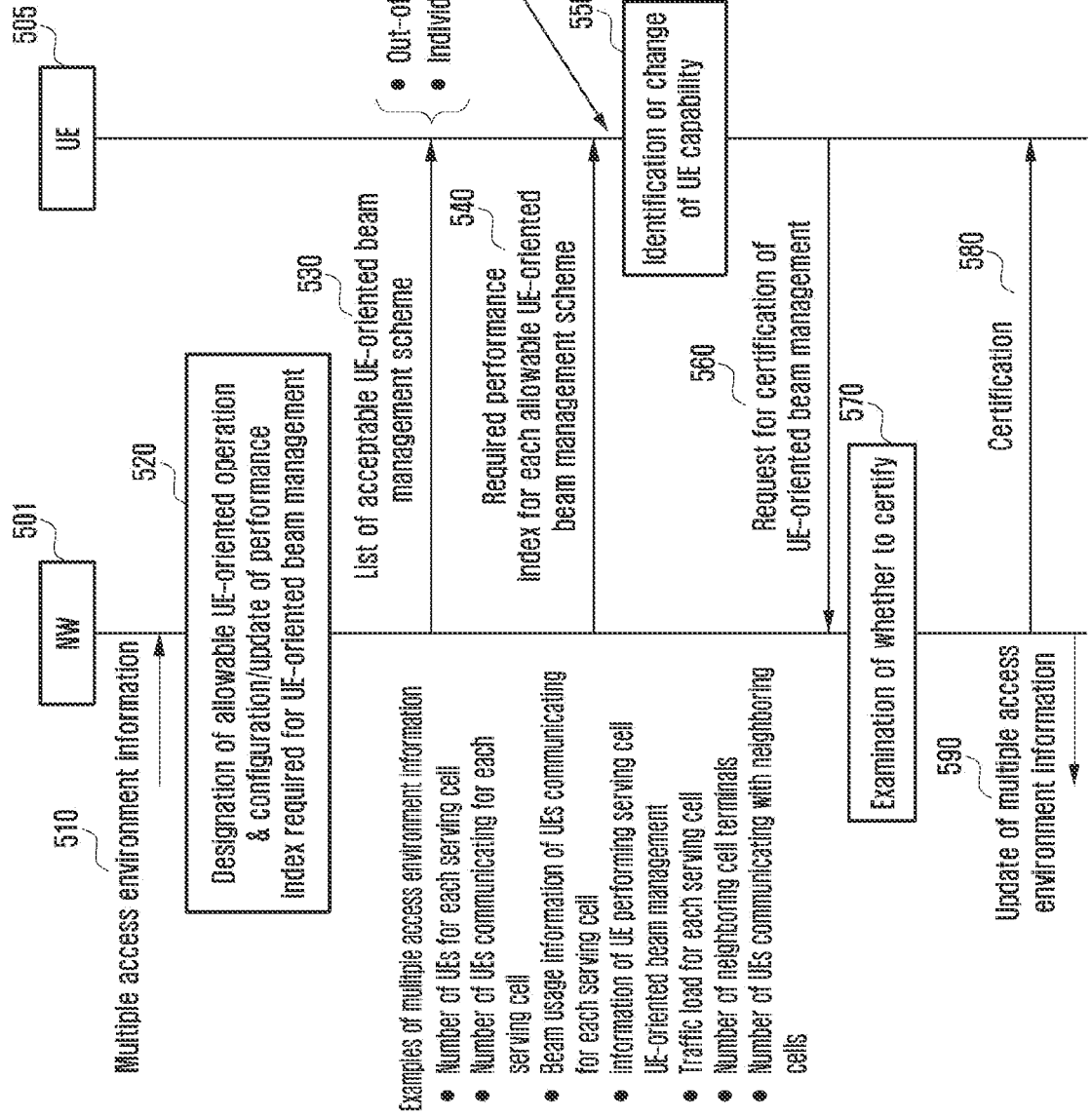
FIG. 5 illustrates an example of a certification process in a terminal-oriented beam management scheme according to an embodiment of the present disclosure.

FIG. 5 illustrates an example of a certification process of a UE-oriented beam management scheme according to an embodiment of the present disclosure.

The disclosure considers two operations of out-of-scope beam determination and individual uplink beam determination as an example of the UE-oriented beam management method, and provides the following two operations as technical improvements.

In one embodiment, in performing UE-oriented beam management, an operation in which the network recognizes the communication situation and permits or prohibits whether to perform UE-oriented beam management for each UE according to the situation In another embodiment, in performing UE-oriented beam management, an operation of changing the beam accordingly when the network receives the UE's beam request In more detail, with reference to FIG. 5, in performing a first step, the network and the UE may perform the following operations.

In operation 510, a network (NW) 501 may collect information on multiple access situations through base stations or cooperation between base stations. The network may be a base station or may be a higher network entity than the base station (e.g., AMF, SMF, UPF, PCF, UDM, UDR, AF, server, etc.).

The information collected and utilized by the network 501 may be information on access and communication state of each serving cell of the UE 505, and may also be information on the UEs acting as neighboring cell terminals for each serving cell. More specifically, it may be at least one of the following information for each serving cell and neighboring cell terminals:

Number of UEs for each cell;
Number of UEs communicating for each cell;
Beam usage information of UEs communicating for each cell;
Traffic load for each cell;
Adjacent interference for each cell;
Number of neighboring cell terminals; and/or
Number of UEs communicating with neighboring cells.

In operation 520, the network 501 may determine whether to permit the UE-oriented beam management, e.g., out-of-scope beam determination or individual uplink beam determination, according to the information situation. In operation 530, the network 501 may transmit the corresponding information to the UE 505.

The determination may include determining whether to permit/support operations for each detailed operation item, for example, "out-of-scope beam determination" and "individual uplink beam determination." For example, a specific base station may permit only the "out-of-scope beam determination" operation, and another base station or cell may permit/support only the "individual uplink beam determination" operation.

The determination may be common for each cell or base station. That is, the UEs within the same base station area or within the same serving cell can be notified of the same permission/support list.

As another example, the base station or the network may differently configure whether to permit/support the UE-oriented beam management scheme for each UE. For example, the configuration may be made in the following scheme.

In one example of scheme, for UEs for which frequent malfunctions have been witnessed/reported, the base station or the network may not configure the permission/support for the corresponding operation regardless of network situations, or may configure to permit/support the corresponding operation only when the communication environment is very good to permit the UE-oriented beam management.

In one example of scheme, in FR2, multiple access interference (MAI) may be determined by a beam used for communication with each user. Therefore, in the case that there are many UEs that prefer the use of a specific direction or specific beam, the base station or the network may not permit "out-of-scope beam determination," "individual uplink beam determination," or both operations only for the UEs requesting the use of the corresponding beam, and may configure each UE to communicate using only designated in-scope beams in consideration of the MAI.

In operation 520, the network 501 may create (configure/update) a performance requirement index of the UE 505 to perform the UE-oriented beam management, e.g., out-of-scope beam determination or individual uplink beam determination, according to the information situation. The requirement index may be an index of how much performance each capability item may satisfy with respect to a plurality of UE capability items.

In one example, in the case of certifying out-of-scope beam determination, the performance index for the corresponding operation may include the following UE capability items:

The number of beams that can be measured by the UE (configuration of performance index above a certain number);
The number of active TCI states supported by the UE (configuration of performance index above a certain number); and/or
Whether or not the UE supports L1-SINR or MAI measurement, or the supported measurement method (configuration of whether measurement is required or measurement through a specific method is required).

In the case that the operating difficulty of the UE-oriented beam management scheme is high only for a specific beam due to reasons such as a concentration of UEs in a specific direction or region or the existence of a large number of UEs that prefer the use of a specific beam, the performance index may be configured differently for each beam. For example, the performance index may be configured differently for a beam indicator such as synchronization signal block (SSB) resource indicator (SRI) or RS resource used for beam management such as SSB resource.

In another example, in the case that it is necessary to avoid additional use of a specific beam for reasons such as a concentration of UEs in a specific direction or region or the existence of a large number of UEs that prefer the use of a specific beam, the base station or the network may configure not to permit the use of a specific beam and notify the UE of this when using the UE-oriented beam management scheme. That is, since the UE may be able to perform UE-oriented beam management without using a specific beam, it is possible to configure a performance index including information indicating that use of a specific beam is not permitted, in consideration of this.

In one example, in the case of certifying individual uplink beam determination, it is possible to configure contents such as what is the panel change or management scheme that the UE may support or can use, or what is the reporting scheme for the uplink beam that the UE may support or can use.

The following schemes can be considered as examples of panel change/management schemes:

Network transparent, non-transparent technique;
Panel specific CSI-RS configuration technique or technique based on it; and/or
Panel specific sounding reference signal (SRS) configuration/transmission technique or technique based on it.

As an example of the uplink beam reporting scheme, a maximum permission exposure (MPE) event reporting scheme that may be used or can be permitted to be used by the UE when the MPE event occurs may be considered.

In operation step 540, the network 501 may deliver the created performance index to the UE 505.

The index can be delivered through various channels such as a downlink control channel (PDCCH) and a downlink information channel (PDSCH: physical downlink shared channel), and the index may be delivered through a signal system for delivering existing configuration information such as system information delivery, component carrier (CC) configuration information delivery, bandwidth part (BWP) configuration information delivery.

In operation 550, the UE 505 may determine whether or not the delivered performance index can be satisfied. In the case that the UE 505 needs to expand the UE capability to satisfy the performance index, the UE 505 may determine whether to expand the capability to satisfy the performance index in consideration of the expected performance improvement compared to the increase in UE's burden, such as an increase in battery consumption due to the expansion.

In operation 560, the UE 505 may report through the base station that the performance index requested by the network 501 is satisfied for the operation to be performed, and may request permission for performing the UE-oriented operation.

When requesting permission, the UE 505 may report details for each index specified in the performance requirement index, for example, the corresponding UE capability and beam information (SRI, etc.) together.

In addition, according to an embodiment, in the case that the UE 505 has already reported the contents of UE performance, such as UE capability, to the network 501 through the base station in advance, and there is no changed item to satisfy the corresponding index, the reporting of the information may be omitted.

The reporting or the delivery of the information can be performed through an uplink control channel (PUCCH: physical uplink control channel), an uplink information channel (PUSCH: physical uplink shared channel), or an initial configuration request channel (PRACH: physical random access channel).

In operation 570, the network 501 may determine whether to certify considering the report and request, and may notify the UE 505 of the result in operation 580.

The notification can be delivered through various channels such as a downlink control channel (PDCCH) and a downlink information channel (PDSCH), and can be delivered using a signal system for conventional configuration information delivery such as system information delivery, component carrier (CC) configuration information delivery, bandwidth part (BWP) configuration information.

In operation 590, in the case of performing the permission in the above operation, network components that have performed the corresponding operation, such as the base station and the local server, can update the corresponding information and share the corresponding information between networks/base stations/cells.

Figure 6:
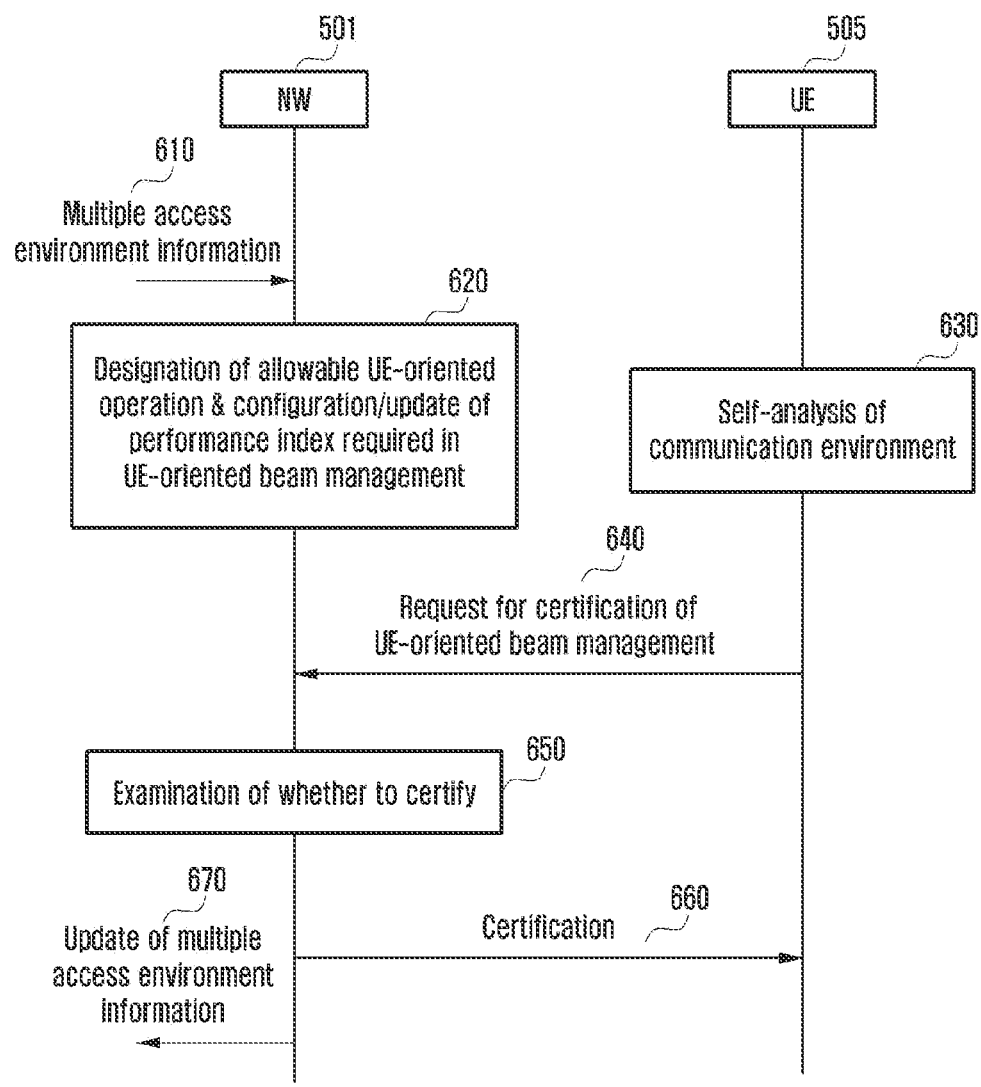
FIG. 6 illustrates an example of a certification process in a terminal-oriented beam management scheme including two-step signal transmission and reception according to an embodiment of the present disclosure.

FIG. 6 illustrates an example of a permission process of a UE-oriented beam management scheme including two-step signal transmission and reception according to an embodiment of the present disclosure.

In performing the operations described in operations 510 to 590 described in the part related to FIG. 5, as a scheme of reducing the burden of transmitting and receiving signals between the base station and the UE, the scheme of omitting the operation of delivering the allowable UE-oriented beam management scheme and requirements by the base station or network to the UE may be also used. In this case, the UE 505 analyzes its own operating performance and communication environment and requests the base station or network 501 to use the UE-oriented beam management scheme, and the base station or network 501 may compare the performance index determined by operations 510 to 530 with the UE capability and communication situation, determine whether to permit the UE-oriented beam control scheme as the method described in operations 570 to 590, and notify and share the result. FIG. 6 is a schematic view of a method for acquiring permission for operation of a UE-oriented beam management scheme through two-step signal transmission and reception according to the above description.

In operation 610 of FIG. 6, the network 501 may collect information for accepting and controlling of UE-oriented beam configuration scheme, for example, information on a multiple access situation, through collaboration with base stations or between base stations. Information on multiple access situation has been described in the part related to FIG. 5 above.

In operation 620, the network 501 may determine whether to permit the performance of UE-oriented beam management, e.g., out-of-scope beam determination or individual uplink beam determination, according to the information situation. Further, the network 501 may create a performance requirement index of the UE 505 to perform the UE-oriented beam management, e.g., the out-of-scope beam determination or individual uplink beam determination, according to the information situation. At this time, unlike FIG. 5, the operation of transmitting the determined information from the network 501 to the UE 505 may be omitted.

In operation 630, the UE 505 self-analyses the communication environment, and in operation 640, the UE 505 may request the base station or the network 501 to use the UE-oriented beam management scheme.

Then, in operation 650, the network 501 may determine whether to certify in consideration of the report and request, and may notify the UE 505 of the result in operation 660. In operation 670, in the case of performing the certification in the above operation, the network component that has performed the corresponding operation, such as the base station and the local server, can update the corresponding information and share the corresponding information between networks/base stations/cells.

Figure 7:
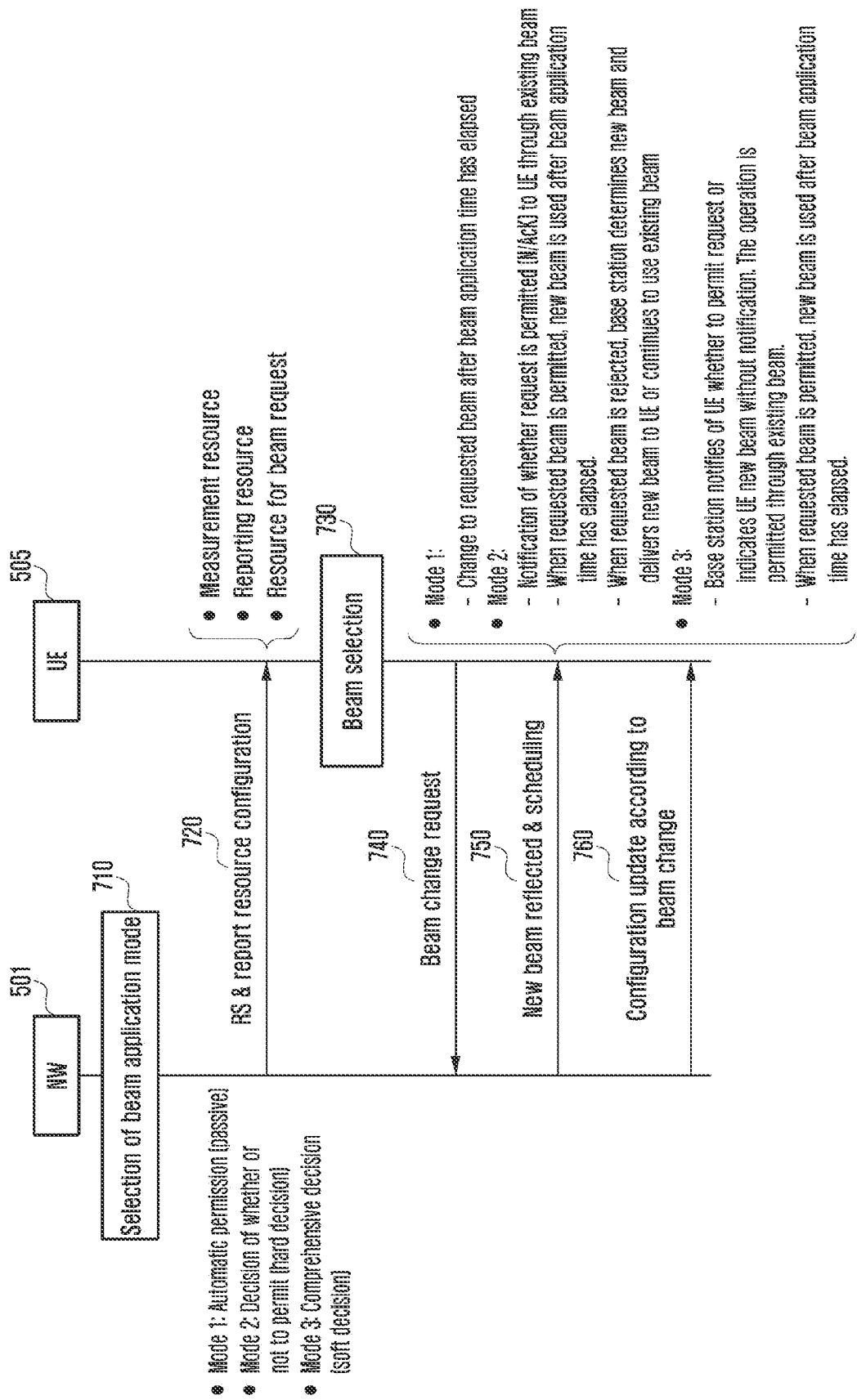
FIG. 7 illustrates an example of a method of applying a beam requested by a terminal according to an embodiment of the present disclosure.

FIG. 7 illustrates an example of a method of applying a beam requested by the UE according to an embodiment of the disclosure.

With reference to FIG. 7, details of the second step operation are as follows.

In operation 710, the base station 501 may determine an operation related to how to respond to the request of the UE 505 when the UE 505 requests a beam change. For example, the determination may be performed in a mode selection scheme, and selectable modes may be the same as the following illustrations.

In one example, for an automatic permission (passive), the base station or network 501 does not reject the beam change request of the UE 505.

In one example, for a decision of whether or not to permit (hard decision), the base station or network 501 may reject the beam change request of the UE 505.

In one example, for a comprehensive decision (soft decision), the base station or network 501 selects a new beam by referring to the beam change request of the UE 505.

In operation 720, the base station or network 501 may or may not deliver the mode to the UE 505, but may deliver to the UE 505 the contents of configurations that vary depending on the selection of the mode, for example, measurement resource configuration, radio resource configuration used for beam reporting or beam use request of the UE 505, and configuration of resources used by the base station 501 to transmit certification or non-certification to the UE 505 (control resource set (CORESET) configuration).

In operation 730, the UE 505 may perform beam measurement and UE-oriented beam management operation using the configured resource.

In the case that the UE 505 determines to change the beam as a result of operation 730, the UE 505 may request the beam change to the base station 501 in operation 740.

In operation 750, the base station or network 501 may deliver to the UE 505 whether or not the request of the UE 505 is permitted, or notify the UE 505 of the beam change result reflecting the request of the UE 505. The content of the notification or delivery may vary according to a response scheme or response mode selected by the base station or the network 501. For example, in the case that the base station 501 selects one of the three modes described in operation 710, the following operation may be performed.

In one example of operation:
The base station or network 501 may permit the beam change request of the UE 505 without a separate notification process; and/or
Beam change to the requested beam may be performed with a delay equal to the time (beam application time) required for beam change of the UE 505 and the base station 501. Until the elapse of the beam application time, communication may be performed using an existing beam.

In one example of operation:
The base station or network 501 may notify the UE 505 whether or not to permit the beam change request of the UE 505;
The notification may be performed through a beam currently in use;
Upon permission of the requested beam, change to the requested beam may be performed with a delay equal to the time (beam application time) required for beam change of the UE 505 and the base station 501. Until the elapse of the beam application time, communication may be performed using an existing beam; and/or
Upon rejecting the request, the base station or network 501 may select a new beam and deliver the selected new beam to the UE 505 or may indicate the UE 505 to continue using the existing beam.

In one example of operation:
The base station or the network 501 may notify the UE 505 whether to permit the beam change request of the UE 505 or instruct the UE 505 to change the beam and designate a new beam without notifying the UE 505; and/or
In the case that the base station or the network 501 notifies the UE 505 of the beam change to the requested beam, the beam change to the requested beam may be performed with a delay equal to the time (beam application time) required to change the beam of the UE 505 and the base station 501. Until the elapse of the beam application time, communication may be performed using an existing beam.

In operation 760, in the case of requiring changing configurations for beam measurement and reporting as a result of the operation, the base station 501 may deliver the corresponding content to the UE 505.

In one example, the base station 501 may change in-scope beam configuration based on the request of the UE 505.

In addition, when the base station or network 501 designates the allowable UE-oriented beam management operation described in step 520 or 620, the UE 505 may request that the base station or network 501 supports or permits a specific operation.

Alternatively, when the base station or the network 501 performs the configuration of the UE performance index described in operation 520 or 620, the UE 505 may request the base station or the network 501 to change the content of the related index.

Figure 8:
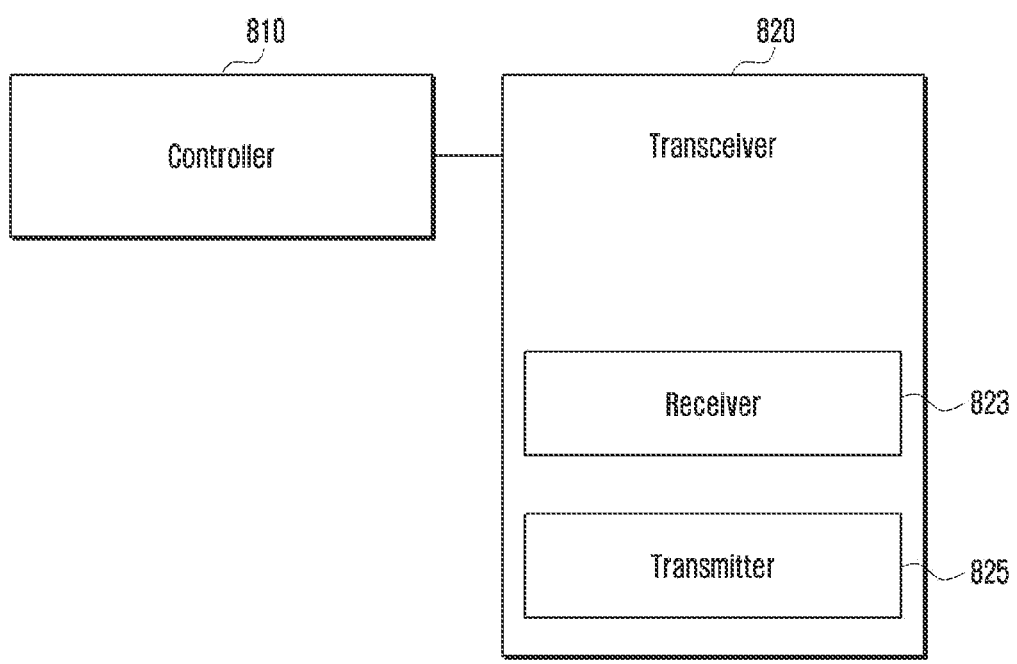
FIG. 8 illustrates a structure of a terminal according to an embodiment of the present disclosure.

FIG. 8 illustrates a structure of a terminal according to the present disclosure.

With reference to FIG. 8, according to an embodiment of the disclosure, a terminal may include a transceiver 820 and a controller 810 for controlling the overall operation of the terminal. Also, the transceiver 820 may include a transmitter 825 and a receiver 823.

The transceiver 820 may transmit and receive signals to/from other network entities.

The controller 810 may control the terminal to perform any one operation of the above-described embodiments. Meanwhile, the controller 810 and the transceiver 820 are not necessarily implemented in separate modules but rather as a single component, e.g., a single chip. Also, the controller 810 and the transceiver 820 may be electrically connected with each other. Also, for example, the controller 810 may be a circuit, an application-specific circuit, or at least one processor. Also, the operations of the terminal may be implemented by providing a memory device storing a corresponding program code in any component of the terminal.

Figure 9:
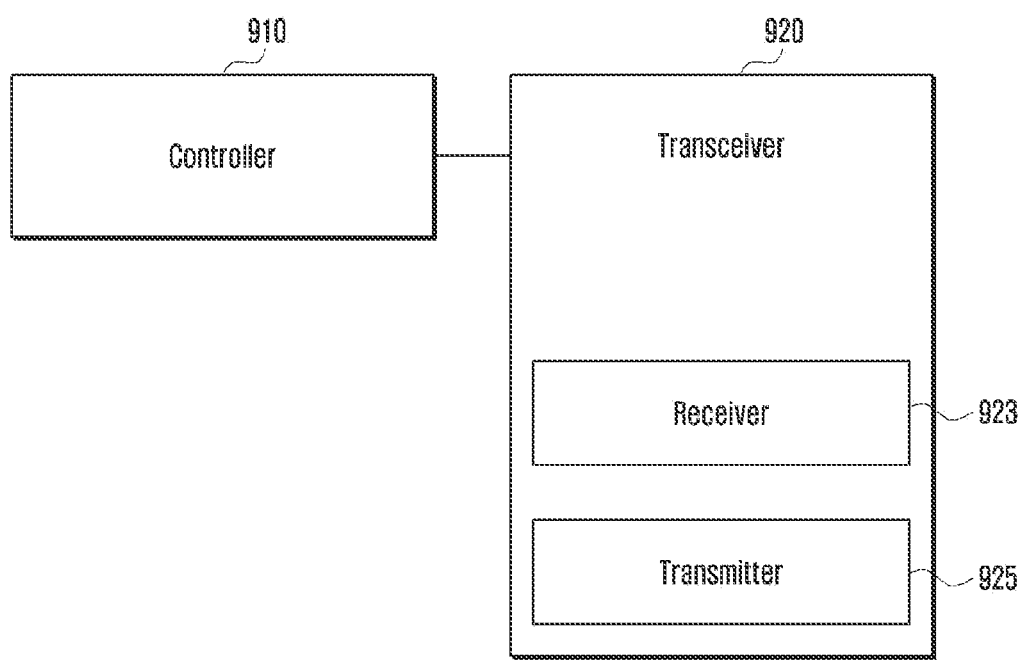
FIG. 9 illustrates a structure of a network entity according to an embodiment of the present disclosure.

FIG. 9 illustrates a structure of a network entity according to an embodiment of the present disclosure.

The network entity of the disclosure is a concept including a network function according to system implementation.

With reference to FIG. 9, according to an embodiment of the disclosure, a network entity may include a transceiver 920 and a controller 910 for controlling the overall operation of the network entity. The transceiver 920 may include a transmitter 925 and a receiver 923.

The transceiver 920 may transmit and receive signals to/from other network entities.

The controller 910 may control the network entity to perform any one operation of the above-described embodiments. Meanwhile, the controller 910 and the transceiver 920 are not necessarily implemented in separate modules but rather as a single component, e.g., a single chip. Also, the controller 910 and the transceiver 920 may be electrically connected with each other. Also, for example, the controller 910 may be a circuit, an application-specific circuit, or at least one processor. Also, the operations of the network entity may be implemented by providing a memory device storing a corresponding program code in any component of the network entity.

The network entity may be any one of a base station, AMF, SMF, UPF, PCF, AF, AS, UDM, UDR, AUSF, NRF, NEF, and the like.

It should be noted that the structure views, example views of control/data signal transmission methods, example views of operational procedures, and structure views of FIGS. 1 to 9 are not intended as limiting the scope of the disclosure. In other words, all the components, entities, or operational steps illustrated in FIGS. 1 to 9 should not be construed as essential components to practice the disclosure, and the disclosure may be rather implemented with only some of the components without departing from the gist of the disclosure.

The above-described operations of the network entity or terminal may be realized by equipping a memory device storing their corresponding program codes in the network entity or any component of the terminal device. That is, the controller in the network entity or terminal device may execute the above-described operations by reading and executing the program codes stored in the memory device by a processor or central processing unit (CPU).

As described herein, various components or modules in the entity, base station or terminal device may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICs.

Although specific embodiments of the disclosure have been described above, various changes may be made thereto without departing from the scope of the disclosure. Thus, the scope of the disclosure should not be limited to the above-described embodiments, and should rather be defined by the following claims and equivalents thereof.

What is claimed is:

1. A method performed by a terminal in a wireless communication system, the method comprising:
   identifying to perform a terminal based beam management based on at least one of a communication environment or a capability of the terminal;
   adjusting the capability of the terminal based on a required capability of the terminal to perform the terminal based beam management;
   transmitting, to a base station, a first message for requesting an allowance of the terminal based beam management; and
   receiving, from the base station, a second message including information indicating whether the terminal based beam management is allowed.

2. The method of claim 1, further comprising:
   determining a beam based on a measurement result;
   transmitting, to the base station, a third message for requesting a beam changing to the determined beam; and
   receiving, from the base station, a fourth message including information on a result of the beam changing.

3. The method of claim 1, wherein identifying to perform the terminal based beam management comprises:
   receiving, from the base station, at least one of information indicating whether the terminal is allowed to perform the terminal based beam management or information on the required capability of the terminal to perform the terminal based beam management; and
   identifying to perform the terminal based beam management based on the at least one of the information indicating whether the terminal is allowed to perform the terminal based beam management, the information on the required capability of the terminal to perform the terminal based beam management, the communication environment, or the capability of the terminal.

4. The method of claim 2, wherein the information on the result of the beam changing comprises at least one of first information on a scheduling based on the determined beam, second information indicating whether the beam changing is allowed, or third information on a beam selected by the base station based on the third message.

5. A method performed by a network entity in a wireless communication system, the method comprising:
   receiving, from a terminal, a first message for requesting an allowance of a terminal based beam management;
   determining whether to allow the terminal based beam management based on at least one of a communication environment or a capability of the terminal; and
   transmitting, to the terminal, a second message including information indicating whether the terminal based beam management is allowed,
   wherein the first message comprises information indicating that the terminal adjusts the capability of the terminal based on a required capability of the terminal to perform the terminal based beam management.

6. The method of claim 5, further comprising:
   receiving, from the terminal, a third message for requesting a beam changing to a beam determined by the terminal; and
   transmitting, to the terminal, a fourth message including information on a result of the beam changing.

7. The method of claim 5, further comprising:
   identifying the communication environment;
   determining whether the terminal is allowed to perform the terminal based beam management based on the communication environment; and
   transmitting, to the terminal, at least one of information indicating whether the terminal is allowed to perform the terminal based beam management or information on the required capability of the terminal to perform the terminal based beam management.

8. The method of claim 6, wherein the information on the result of the beam changing comprises at least one of first information on a scheduling based on the determined beam, second information indicating whether the beam changing is allowed, or third information on a beam selected by a base station based on the third message.

9. A terminal in a wireless communication system, the terminal comprising:
   a transceiver; and
   a controller coupled with the transceiver and configured to:
      identify to perform a terminal based beam management based on at least one of a communication environment or a capability of the terminal,
      adjust the capability of the terminal based on a required capability of the terminal to perform the terminal based beam management,
      transmit, to a base station, a first message for requesting an allowance of the terminal based beam management, and
      receive, from the base station, a second message including information indicating whether the terminal based beam management is allowed.

10. The terminal of claim 9, wherein the controller is further configured to:
    determine a beam based on a measurement result;
    transmit, to the base station, a third message for requesting a beam changing to the determined beam; and
    receive, from the base station, a fourth message including information on a result of the beam changing.

11. The terminal of claim 9, wherein the controller is further configured to:
    receive, from the base station, at least one of information indicating whether the terminal is allowed to perform the terminal based beam management or information on the required capability of the terminal to perform the terminal based beam management; and
    identify to perform the terminal based beam management based on the at least one of the information indicating whether the terminal is allowed to perform the terminal based beam management, the information on the required capability of the terminal to perform the terminal based beam management, the communication environment, or the capability of the terminal.

12. The terminal of claim 10, wherein the information on the result of the beam changing comprises at least one of first information on a scheduling based on the determined beam, second information indicating whether the beam changing is allowed, or third information on a beam selected by the base station based on the third message.

13. A network entity in a wireless communication system, the network entity comprising:
    a transceiver; and
    a controller coupled with the transceiver and configured to:

receive, from a terminal, a first message for requesting an allowance of a terminal based beam management, determine whether to allow the terminal based beam management based on at least one of a communication environment or a capability of the terminal, and transmit, to the terminal, a second message including information indicating whether the terminal based beam management is allowed, wherein the first message comprises information indicating that the terminal adjusts the capability of the terminal based on a required capability of the terminal to perform the terminal based beam management.

14. The network entity of claim 13, wherein the controller is further configured to:

receive, from the terminal, a third message for requesting a beam changing to a beam determined by the terminal; and transmit, to the terminal, a fourth message including information on a result of the beam changing.

15. The network entity of claim 13, wherein the controller is further configured to:

identify the communication environment;

determine whether the terminal is allowed to perform the terminal based beam management based on the communication environment; and transmit, to the terminal, at least one of information indicating whether the terminal is allowed to perform the terminal based beam management or information on the required capability of the terminal to perform the terminal based beam management.

16. The network entity of claim 14, wherein the information on the result of the beam changing comprises at least one of first information on a scheduling based on the determined beam, second information indicating whether the beam changing is allowed, or third information on a beam selected by a base station based on the third message.

* * * * *